(12) United States Patent
Su et al.

(10) Patent No.: US 11,070,777 B2
(45) Date of Patent: Jul. 20, 2021

(54) PROJECTION APPARATUS AND OPERATION METHOD THEREOF

(71) Applicant: Coretronic Corporation, Hsin-Chu (TW)

(72) Inventors: Wei-Chih Su, Hsin-Chu (TW); Sheng-Yu Chiu, Hsin-Chu (TW); Po-Yen Wu, Hsinchu (TW); Jung-Chi Chen, Hsin-Chu (TW); Chih-Lin Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/690,101

(22) Filed: Nov. 20, 2019

(65) Prior Publication Data

US 2020/0169708 A1 May 28, 2020

(30) Foreign Application Priority Data

Nov. 23, 2018 (CN) .......................... 201811406177.6
Dec. 24, 2018 (CN) .......................... 201811582405.5

(51) Int. Cl.
*H04N 9/31* (2006.01)
*G06T 7/90* (2017.01)
(Continued)

(52) U.S. Cl.
CPC ............. *H04N 9/3182* (2013.01); *G06T 7/90* (2017.01); *H04N 5/57* (2013.01); *H04N 9/3164* (2013.01); *H04N 21/42204* (2013.01)

(58) Field of Classification Search
CPC ...... H04N 9/3182; H04N 9/31; H04N 9/3164; H04N 5/44; H04N 5/4403; H04N 5/57; G06T 7/90
(Continued)

(56) References Cited

U.S. PATENT DOCUMENTS 6,894,675 B2 * 5/2005 Bruning ............... H05B 41/386
345/102
9,349,062 B2 5/2016 Mei et al.
(Continued)

FOREIGN PATENT DOCUMENTS

JP 2012238520 12/2012
WO 2018025390 2/2018

OTHER PUBLICATIONS

"Search Report of Europe Counterpart Application", dated Jul. 24, 2020, p. 1-p. 15.
(Continued)

*Primary Examiner* — Trang U Tran
(74) *Attorney, Agent, or Firm* — JCIPRNET

(57) ABSTRACT

A projection apparatus and its operation method are provided. The projection apparatus includes a light-emitting device, a driving circuit coupled to the light-emitting device, and a control circuit receiving at least one video frame and analyzing color content of the at least one video frame. According to at least one control signal, the driving circuit drives the light-emitting device to generate a projected beam. The control circuit selects a highlight mode or a normal mode as a selected mode according to the color content and correspondingly sets at least one control signal to the driving circuit according to the selected mode. A brightness of the projected beam of the light-emitting device in the highlight mode is greater than that in the normal mode.

24 Claims, 8 Drawing Sheets

(51) Int. Cl.
 *H04N 5/57* (2006.01)
 *H04N 21/422* (2011.01)
(58) Field of Classification Search
 USPC .................................................. 348/744, 743
 See application file for complete search history.

(56) References Cited

U.S. PATENT DOCUMENTS

| | | | |
|---|---|---|---|
| 9,664,376 | B2 * | 5/2017 | Abe ..................... H04N 13/359 |
| 9,706,180 | B2 | 7/2017 | Haraguchi et al. |
| 10,511,729 | B1 * | 12/2019 | Fukushima ........ H04N 1/00167 |
| 2003/0179192 | A1 | 9/2003 | Allen et al. |
| 2010/0091050 | A1 | 4/2010 | El-Ghoroury et al. |
| 2012/0182525 | A1 | 7/2012 | Imai et al. |
| 2019/0191132 | A1 | 6/2019 | Kobayashi et al. |

OTHER PUBLICATIONS

"Search Report of Europe Counterpart Application", dated Apr. 24, 2020, p. 1-p. 16.

* cited by examiner

PROJECTION APPARATUS AND OPERATION METHOD THEREOF

CROSS-REFERENCE TO RELATED APPLICATION

This application claims the priority benefit of China patent applications serial no. 201811406177.6, filed on Nov. 23, 2018 and serial no. 201811582405.5, filed on Dec. 24, 2018. The entirety of each of the above-mentioned patent applications is hereby incorporated by reference herein and made a part of this specification.

BACKGROUND OF THE INVENTION

Field of the Invention

The invention relates to a light-emitting technology; more particularly, the invention relates to a projection apparatus and an operation method thereof.

Description of Related Art

In known projection lamps, light-emitting devices simply emit projected beams with fixed brightness, and the known projection lamps are unable to adjust the brightness of the project beams according to different scenarios. For instance, since the brightness of the projected beams of the known projection lamps are fixed, it is unlikely to enhance the projection beam for certain object or in response to a certain scenario.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention were acknowledged by people of ordinary skill in the pertinent art.

SUMMARY OF THE INVENTION

The invention provides a projection apparatus and an operation method thereof to dynamically increase a brightness of a projected beam of a light-emitting device according to color content of a video frame.

Other advantages can be further illustrated by the technical features broadly embodied and described as follows.

In order to achieve one or a portion of or all of the objectives or other objectives, an embodiment of the invention provides a projection apparatus. The projection apparatus includes a light-emitting device, a driving circuit, and a control circuit. The driving circuit is coupled to the light-emitting device. According to at least one control signal, the driving circuit is configured to drive the light-emitting device to generate a projected beam. The control circuit is configured to receive at least one video frame and analyze color content of the at least one video frame. The control circuit selects one of a highlight mode and a normal mode as a selected mode according to the color content and correspondingly sets at least one control signal to the driving circuit according to the selected mode. A brightness of the projected beam of the light-emitting device in the highlight mode is greater than that in the normal mode.

To achieve one, part, or all of the foregoing purposes or other purposes, an embodiment of the invention provides an operation method of a projection apparatus. The operation method includes: driving a light-emitting device by a driving circuit according to at least one control signal to generate a projected beam; analyzing color content of at least one video frame by a control circuit; selecting by the control circuit one of a highlight mode and a normal mode as a selected mode according to the color content and correspondingly setting the at least one control signal to the driving circuit according to the selected mode. A brightness of the projected beam of the light-emitting device in the highlight mode is greater than that in the normal mode.

In light of the above, the embodiments of the invention at least demonstrate one of the advantages or effects below. In the projection apparatus and according to the operation method of the projection apparatus, the color content of the video frame can be analyzed. According to the color content of the video frame, the projection apparatus can switch the operation mode to one of the highlight mode and the normal mode. Hence, the projection apparatus is able to dynamically increase the brightness of the projected beam of the light-emitting device according to actual scenarios.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
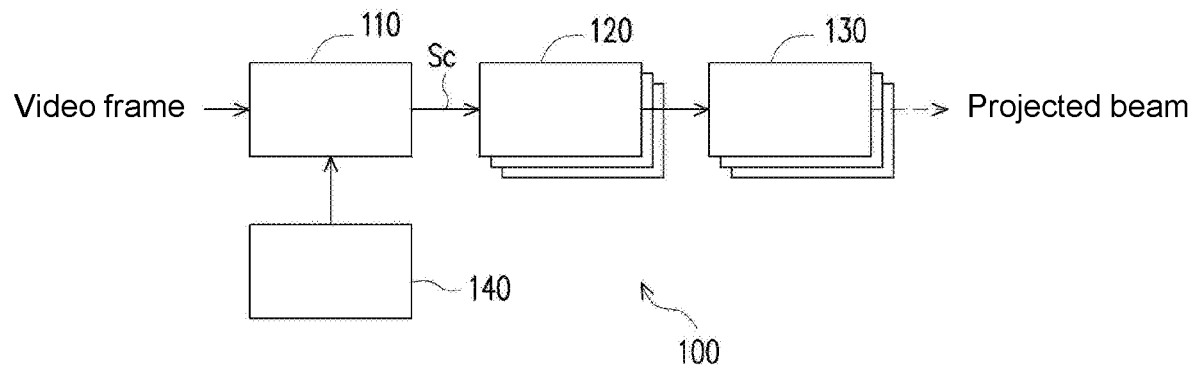
FIG. 1 is a schematic circuit block view of a projection apparatus according to an embodiment of the invention.

FIG. 1 is a schematic circuit block view of a projection apparatus 100 according to an embodiment of the invention. According to design requirements, the projection apparatus 100 may act as a projection lamp, a projector, and/or any other optical projection apparatus. In the embodiment shown in FIG. 1, the projection apparatus 100 includes a control circuit 110, at least one driving circuit 120, and at least one light-emitting device 130. For the clarity of drawings, other components (e.g., a display panel, a keyboard panel, and so on) of the projection apparatus 100 are not depicted in FIG. 1.

The control circuit 110 can receive at least one video frame (or a video frame stream). The control circuit 110 can analyze color content of the video frame and select one of a highlight mode and a normal mode as a selected mode according to the color content of the video frame. The control circuit 110 correspondingly sets (assigns) at least one control signal Sc to the driving circuit 120 according to the selected mode.

An input terminal of the driving circuit 120 is coupled to the control circuit 110 to receive the control signal Sc. An output terminal of the driving circuit 120 is coupled to the light-emitting device 130. The control circuit 110 correspondingly sets the control signal Sc according to the selected mode, and the driving circuit 120 can drive the light-emitting device 130 to generate a projected beam according to the control signal Sc. The projected beam generated by the light-emitting device 130 can be projected to the outside of the projection apparatus 100 through an optical element (or an optical element set, not shown). According to design requirements, the optical element (or the optical element set) may include a light valve, a lens (or a lens assembly), a mirror, and/or other optical elements.

The control circuit 110 correspondingly sets the control signal Sc according to the selected mode, and the driving circuit 120 can drive the light-emitting device 130 to generate a projected beam according to the control signal Sc. Hence, the control circuit 110 can adjust the brightness of the projected beam of the light-emitting device 130 according to the selected mode. Here, a brightness of the projected beam of the light-emitting device 130 in the highlight mode is greater than the brightness of the projected beam of the light-emitting device 130 in the normal mode. In the normal mode, the control circuit 110 can decrease the driving current of the light-emitting device 130, so as to reduce power consumption. In the highlight mode, the control circuit 110 can increase the driving current of the light-emitting device 130 (e.g., by setting the driving current as a rated current/maximum current of the light-emitting device 130), so as to ensure that the output has a super brightness.

Figure 2:
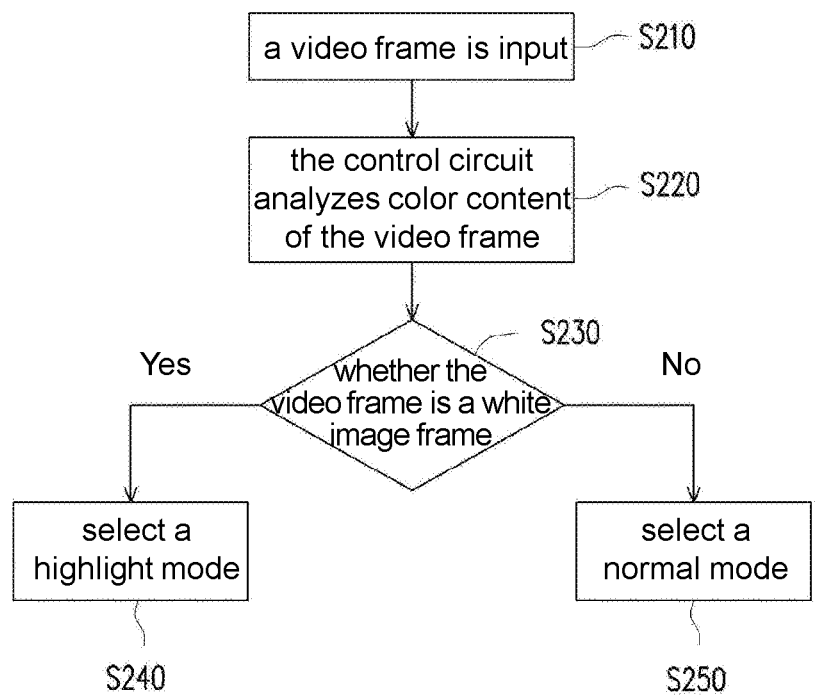
FIG. 2 is a schematic flowchart of an operation method of a projection apparatus according to an embodiment of the invention.

The control circuit 110 can, according to design requirements, analyze the color content of the video frame in any manner, and the conditions of determining the selected mode can also be decided according to the design requirements. For instance, FIG. 2 is a schematic block view of a control device according to an embodiment of the invention. In step S210, a video frame (or a video frame stream) is input to a control circuit 110. In step S220, the control circuit 110 can analyze color content of the video frame. In step S230, the control circuit 110 can determine whether the video frame is a white image frame (e.g., an all-white image).

When the color content of the video frame indicates that the video frame is the white image frame (i.e., the step S230 is yes), the control circuit 110 selects a highlight mode as a selected mode (step S240) and sets a control signal Sc according to the highlight mode. The driving circuit 120 can adjust/set the driving current for driving the light-emitting device 130 in accordance with the control signal Sc. In the highlight mode, the driving current provided by the driver circuit 120 to the light-emitting device 130 may be fixed current (the driving current is not related to the application scenario or other application conditions). The driving current supplied to the light-emitting device 130 in the highlight mode is greater than the driving current supplied to the light-emitting device 130 in the normal mode.

When the color content of the video frame indicates that the video frame is not the white image frame (i.e., the step S230 is no), the control circuit 110 selects a normal mode as the selected mode (step S250) and correspondingly sets a control signal Sc according to the normal mode. In the normal mode, based on the control of the control circuit 110, the driving circuit 120 can dynamically adjust/variate the driving current of the light-emitting device 130 according to the application scenario or other application conditions. The driving current supplied to the light-emitting device 130 in the normal mode is smaller than the driving current supplied to the light-emitting device 130 in the highlight mode.

In any case, the way to operate the control circuit 110 should not be limited to those provided in the embodiment depicted in FIG. 2. For instance, in another embodiment, when the color content of the video frame indicates that the video frame is the white image frame (e.g., the all-white image), an operation mode of the control circuit 110 can be switched from the normal mode to the highlight mode, and the control circuit 110 correspondingly sets the control signal Sc according to the highlight mode; when a non-white object shows up in the white image frame, or when the color content of the video frame indicates that the video frame is no longer the white image frame, the operation mode of the control circuit 110 is switched from the highlight mode to the normal mode, and the control circuit 110 correspondingly sets the control signal Sc according to the normal mode. For instance, if a mouse cursors moves into the white image frame, the operation mode of the control circuit 110 is instantly switched from the highlight mode to the normal mode.

Figure 3:
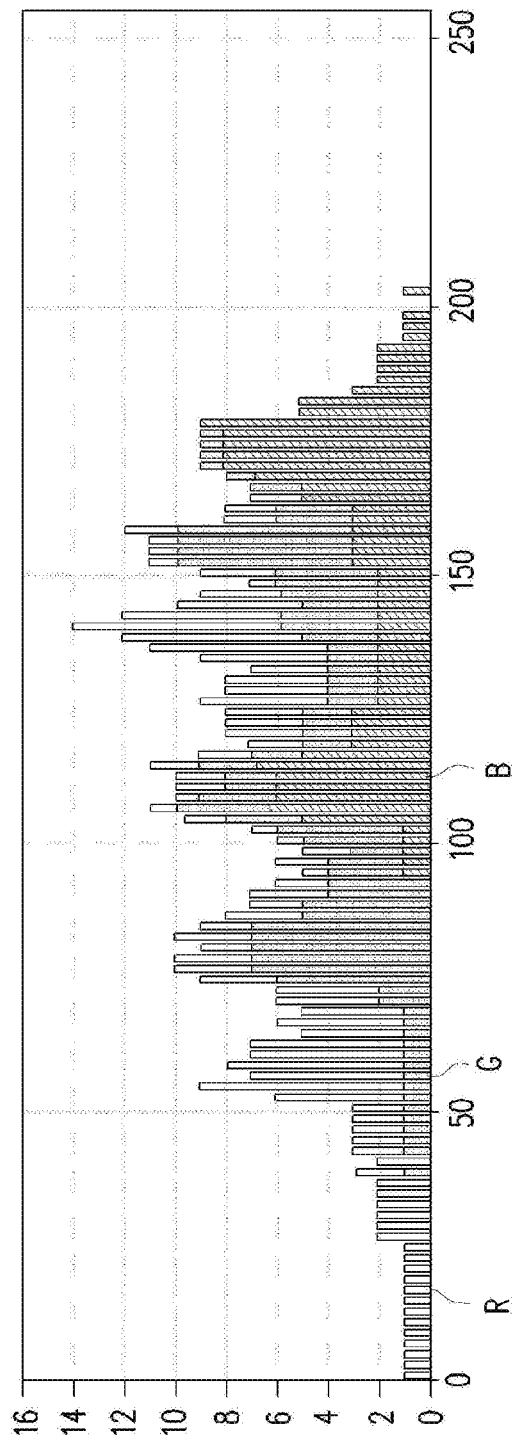
FIG. 3 is a histogram of a video frame according to an embodiment of the invention.

In still another embodiment, the control circuit 110 can determine the color content of the video frame (e.g., determine whether the white image occupies most of the video frame) according to a histogram of the video frame. For instance, FIG. 3 is a histogram of a video frame according to an embodiment of the invention. Please refer to FIG. 1 and FIG. 3. The control circuit 110 can analyze red sub-pixels in the video frame and thus obtain the histogram R of the red sub-pixels, analyze green sub-pixels in the video frame and thus obtain the histogram G of the green sub-pixels, and analyze blue sub-pixels in the video frame and thus obtain the histogram B of the blue sub-pixels. Generally, the horizontal axis of the histogram represents the gray scale, and the vertical axis of the histogram represents the number of sub-pixels, wherein the histograms of different pixels are represented by different line forms, the histogram R of the red sub-pixels is represented by a blank, the histogram G of the green sub-pixels is represented by a dot matrix, and the histogram B of the blue sub-pixels is indicated by a diagonal line. To better explain the invention, in the video frame, if a red sub-pixel satisfies a condition that a gray scale of the red sub-pixel is greater than a red threshold, a ratio of the number of the red sub-pixels satisfying the condition to the number of all red sub-pixels in the video frame is a first ratio; if a green sub-pixel satisfies a condition that a gray scale of the green sub-pixel is greater than a green threshold, a ratio of the number of the green sub-pixels satisfying the condition to the number of all green sub-pixels in the video frame is a second ratio; if a blue sub-pixel satisfies a condition that a gray scale of the blue sub-pixel is greater than a blue threshold, a ratio of the number of the blue sub-pixels satisfying the condition to the number of all blue sub-pixels in the video frame is a third ratio. Here, the red threshold, the green threshold, and the blue threshold can be determined according to design requirements.

When the first ratio is greater than a first ratio threshold, the second ratio is greater than a second ratio threshold, and the third ratio is greater than a third ratio threshold, the control circuit 110 selects the highlight mode as the selected mode and correspondingly sets the control signal Sc according to the highlight mode. When the first ratio is less than the first ratio threshold, the second ratio is less than the second ratio threshold, or the third ratio is less than the third ratio threshold, the control circuit 110 selects the normal mode as the selected mode and correspondingly sets the control signal Sc according to the normal mode. Here, the first ratio threshold, the second ratio threshold, and the third ratio threshold can be determined according to design requirements. The first ratio threshold, the second ratio threshold, and the third ratio threshold can be the same values or different values. For instance, if the first ratio is greater than 95%, the second ratio is greater than 95%, and the third ratio is greater than 95%, the control circuit 110 selects the highlight mode as the selected mode.

In the embodiment shown in FIG. 1, the projection apparatus 100 further includes a user interface circuit 140. The user interface circuit 140 is able to provide a human-machine interface for receiving a user's command. When a user input the user's command through the human-machine interface, the user interface circuit 140 can transmit the user's command to the control circuit 110. At this time, the control circuit 110 can select one of the highlight mode and the normal mode as the selected mode according to the user's command and further correspondingly set the control signal Sc according to the selected mode. According to design requirements, in some embodiments, the user interface circuit 140 may be omitted.

Figure 4:
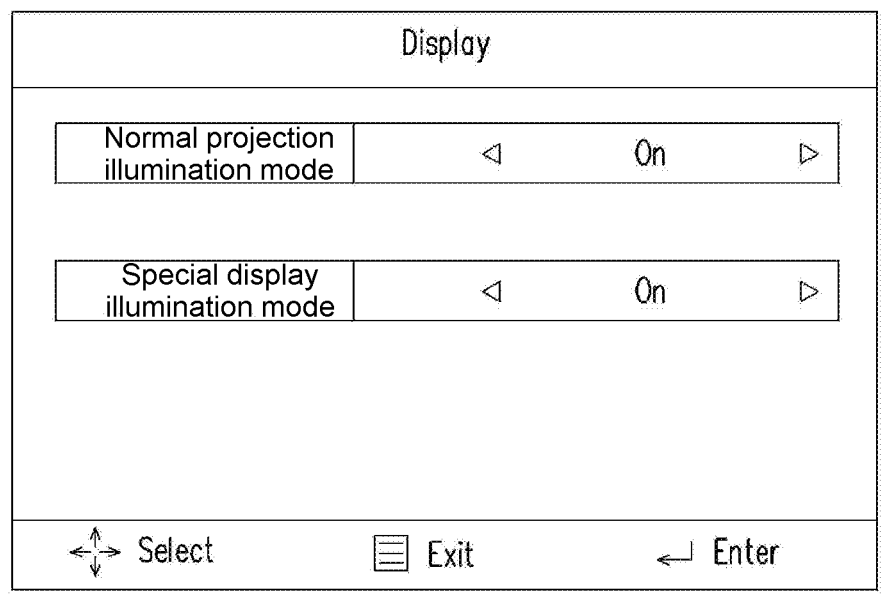
FIG. 4 is a schematic view of a human-machine interface according to an embodiment of the invention.

FIG. 4 is a schematic view of a human-machine interface according to an embodiment of the invention. The user interface circuit 140 can provide the human-machine interface image shown in FIG. 4, i.e., an on-screen display (OSD) menu. The user can select to enable a "normal projection illumination mode" and/or a "special display illumination mode". Through an input mechanism (e.g., buttons, a touch panel, a mouse cursor, and/or other input components), the user can transmit the user's command to the user interface circuit 140. The user interface circuit 140 can transmit the user's command to the control circuit 110. At this time, the control circuit 110 can select one of the highlight mode and the normal mode as the selected mode according to the user's command and further correspondingly set the control signal Sc according to the selected mode. For instance, when the "special display illumination mode" is enabled by the user (the set value is "On"), the control circuit 110 can perform the process depicted in FIG. 2.

In another embodiment, the user interface circuit 140 can receive an Infrared (IR) signal. The user can transmit the user's command to the user interface circuit 140 through an IR remote control, so as to set the operation mode of the control circuit 110 as the highlight mode or the normal mode.

In still another embodiment, a personal computer may be connected to the user interface circuit 140 through a RS-232 connection port (a computer serial port). The personal computer can transmit the user's command to the user interface circuit 140, so as to determine whether the operation mode of the control circuit 110 is set as the highlight mode or the normal mode.

The way to implement the light-emitting device 130 depicted in FIG. 1 can be determined according to design requirements. For instance, the light-emitting device 130 may include a laser light source, a light-emitting diode (LED), a light bulb, or any other light-emitting component. The light-emitting device 130 may include one or more light-emitting components. In case that the light-emitting device 130 includes plural light-emitting components, the number of the driving circuit 120 may be plural, so as to respectively drive the light-emitting components. In case that the light-emitting device 130 includes one light-emitting component, the number of the driving circuit 120 may just be one.

A color of the projected beam of the light-emitting device 130 can be determined according to design requirements. For instance, the light-emitting device 130 may include a white LED to emit a white projected beam. In some embodiments, the light-emitting device 130 can include a red LED, a green LED, and a blue LED. The driving circuit 120 can drive the red LED, the green LED, and the blue LED of the light-emitting device 130 according to the control signal Sc to generate the projected beam. In the normal mode, a light-emitting period of the blue LED and a light-emitting period of the red LED are not overlapped, and the light-emitting period of the blue LED and a light-emitting period of the green LED are not overlapped. Namely, through color mixture in time domain, the light-emitting device 130 applies the red LED, the green LED, and the blue LED to emit white projected beam or projected beams of other colors. In the highlight mode, the light-emitting period of the red LED, the light-emitting period of the green LED, and a light-emitting period of the blue LED are completely overlapped, so as to emit the white projected beam with great brightness. In some embodiments, the light-emitting device 130 may include a white LED which is turned on in the highlight mode, such as a light-emitting period of the white LED, a light-emitting period of the red LED, a light-emitting period of the green LED, and a light-emitting period of the blue LED are completely overlapped in the highlight mode to generate the white projected beam.

In some embodiments, the control signal Sc includes a first switch signal associated with the red LED, a second switch signal associated with the green LED, and a third switch signal associated with the blue LED. According to the first switch signal, the second switch signal, and the third switch signal, the driving circuit 120 can respectively drive the red LED, the green LED, and the blue LED of the light-emitting device 130, so as to generate the projected beam. For instance, when the first switch signal is at a first logic level, the red LED emits light; when the first switch signal is at a second logic level, the red LED does not emit light. In the highlight mode, a duty ratio of the first switch signal, a duty ratio of the second switch signal, and a duty ratio of the third switch signal are all 100%. Hence, the light-emitting device 130 can emit the white projected beam with great brightness. In the normal mode, the duty ratio of at least one of the first switch signal, the second switch signal, and the third switch signal is less than 100%.

In other embodiments, the duty ratio of the first switch signal, the duty ratio of the second switch signal, and the duty ratio of the third switch signal may be a fixed value close to 100% in the highlight mode. The duty ratio of the first switch signal, the duty ratio of the second switch signal, and the duty ratio of the third switch signal may be a dynamic value away from 100% (e.g., a dynamic value between 0% and 50%, but the invention is not limited thereto) in a normal mode.

Figure 5:
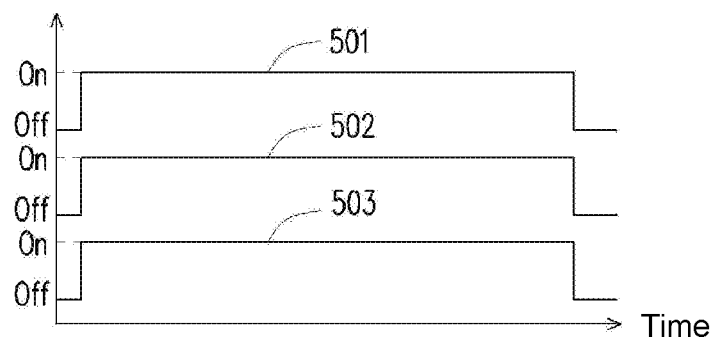
FIG. 5 is a schematic diagram showing the activation periods (duty periods) of a red light emitting diode (LED), a green LED, and a blue LED in a highlight mode according to an embodiment of the invention.

FIG. 5 is a schematic diagram showing the activation periods (duty periods) of a red light emitting diode (LED), a green LED, and a blue LED in a highlight mode according to an embodiment of the invention. The horizontal axis shown in FIG. 5 represents time, and the vertical axis represents the state of the LED. "On" in FIG. 5 indicates that the LED is turn on, and "Off" indicates that the LED is turn off. The "activation period" means a period during which the state of the LED is continuously turned on (that is, a period during which the light is continuously emitted). The curve 501 shown in FIG. 5 indicates the state of the red LED, the curve 502 indicates the state of the green LED, and the curve 503 indicates the state of the blue LED.

In the highlight mode, the duty ratio of the red LED, the duty ratio of the green LED, and the duty ratio of the blue LED can be fixed values close to 100%, or even 100%. Therefore, in the embodiment shown in FIG. 5, the activation period of the red LED, the activation period of the green LED, and the activation period of the blue LED completely overlap each other. That is, the overlapping ratio of the activation period of the curve 501 shown in FIG. 5 and the activation period of the curve 502 is 100%, and the overlapping ratio of the activation period of the curve 502 and the activation period of the curve 503 is also 100%. In an embodiment, the duty ratio of the red LED, the duty ratio of the green LED, and the duty ratio of the blue LED may be 100%. That is, in one period, the "On" states of the curves 501 to 503 are completely interactively overlapped, that is, the overlapping ratio of between the three activation periods is 100%, so that the light-emitting device 130 can continuously emit positive-white projected light with high brightness.

In other embodiments, the user interface circuit 140 may transmit an overlay adjustment information (user instructions) to the control circuit 110 to set/adjust the overlapping ratio of the activation period of the red LED, the activation period of the green LED, and the activation period of the blue LED during the highlight mode.

Figure 6:
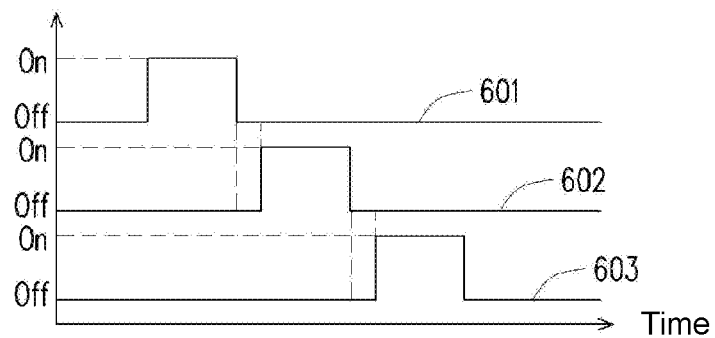
FIG. 6 is a schematic diagram showing the activation periods of a red LED, a green LED, and a blue LED in a normal mode according to an embodiment of the invention.

FIG. 6 is a schematic diagram showing the activation periods of a red LED, a green LED, and a blue LED in a normal mode according to an embodiment of the invention. The horizontal axis shown in FIG. 6 represents time, and the vertical axis represents the state of the LED. "On" in FIG. 6 indicates that the LED is turned on, and "Off" indicates that the LED is turned off. The curve 601 shown in FIG. 6 indicates the state of the red LED, the curve 602 indicates the state of the green LED, and the curve 603 indicates the state of the blue LED.

In the normal mode, the duty ratios of the red, green, and blue LEDs may be dynamic values that are away from 100%, such as between 0% and 90%. In addition, in the embodiment shown in FIG. 6, the activation period of the red LED, the activation period of the green LED, and the activation period of the blue LED do not overlap each other at all. That is, the overlapping ratio of the activation period of the curve 601 (the red LED) shown in FIG. 6 and the activation period of the curve 602 (the green LED) is 0%, and the overlapping ratio of the activation period of the curve 602 (the green LED) and the activation period of the curve 603 (the blue LED) is also 0%.

Figure 7:
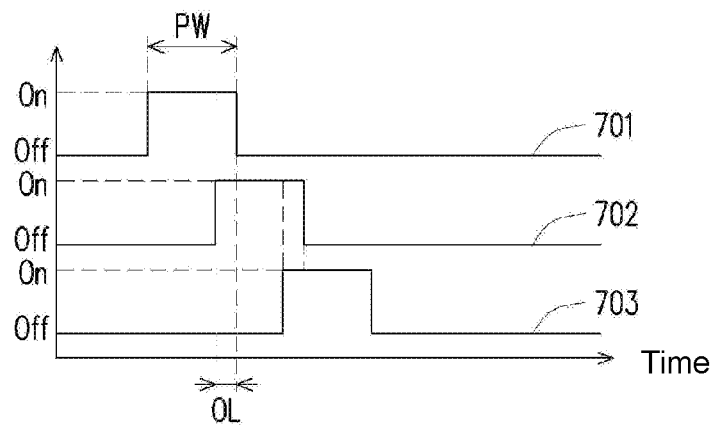
FIG. 7 is a schematic view showing the activation periods of a red LED, a green LED, and a blue LED in a normal mode according to another embodiment of the invention.

FIG. 7 is a schematic view showing the activation periods of a red LED, a green LED, and a blue LED in a normal mode according to another embodiment of the invention. The horizontal axis shown in FIG. 7 represents time, and the vertical axis represents the state of the LED. "On" in FIG. 7 indicates that the LED is turned on, and "Off" indicates that the LED is turned off. The curve 701 shown in FIG. 7 indicates the state of the red LED, the curve 702 indicates the state of the green LED, and the curve 703 indicates the state of the LED.

In the embodiment shown in FIG. 7, the activation period of the red LED, the activation period of the green LED, and the activation period of the blue LED partially overlap each other. "PW" shown in FIG. 7 indicates an activation period of the LED (a period of "continuously turned on"), and "OL" indicates an overlapping period in which the activation periods of the two LEDs partially overlap each other. The overlapping ratio of the overlapping period OL to the activation period PW may be an arbitrary value. For example, in the normal mode, the overlapping ratio of two of the activation period of the red LED, the activation period of the green LED, and the activation period of the blue LED is from 0 to 40%. In detail, the overlapping ratio (i.e., the ratio of OL to PW) of the activation period of the curve 701 (the red LED) shown in FIG. 7 and the activation period of the curve 702 (the green LED) may be 0 to 40%, and the overlapping ratio (i.e., the ratio of OL to PW) of the activation period of the curve 702 (the green LED) and the activation period of the curve 703 (the blue LED) may also be 0-40%.

In the highlight mode, the driving current of the light-emitting device 130 may be a fixed large current. In the normal mode, the driving current of the light-emitting device 130 may be a small current that is dynamically adjusted and fluctuates. In the normal mode, the control circuit 110 can reduce the driving current of the light-emitting device 130 to save power consumption. In the highlight mode, the control circuit 110 can increase the driving current of the light-emitting device 130 to ensure that the output has a super brightness.

In some embodiments, the driving circuit 120 may include a first current source (not shown), a second current source (not shown), and a third current source (not shown), and the control signal Sc includes a first bias voltage, a second bias voltage, and a third bias voltage. The first bias voltage controls a first current source associated with the red LED of the light-emitting device 130, the second bias voltage controls a second current source associated with the green LED of the light-emitting device 130, and the third bias voltage controls a third current source associated with the blue LED of the light-emitting device 130. For instance, when the current from the first current source is increased by changing the first bias voltage, the brightness of the projected beam of the red LED of the light-emitting device 130 can be increased. In the highlight mode, the first bias voltage is a first fixed voltage, the second bias voltage is a second fixed voltage, and the third bias voltage is a third fixed voltage. Here, the level of the first fixed voltage, the level of the second fixed voltage, and the level of the third fixed voltage can be determined according to design requirements. For instance, the level of the fixed voltage can be designed according to electrical conditions and the current source of the light-emitting device. In the normal mode, the first bias voltage is a first dynamic voltage less than the first fixed voltage, the second bias voltage is a second dynamic voltage less than the second fixed voltage, and the third bias voltage is a third dynamic voltage less than the third fixed voltage. Hence, the brightness of the projected beam of the light-emitting device 130 in the highlight mode is greater than the brightness of the projected beam of the light-emitting device 130 in the normal mode.

Figure 8:
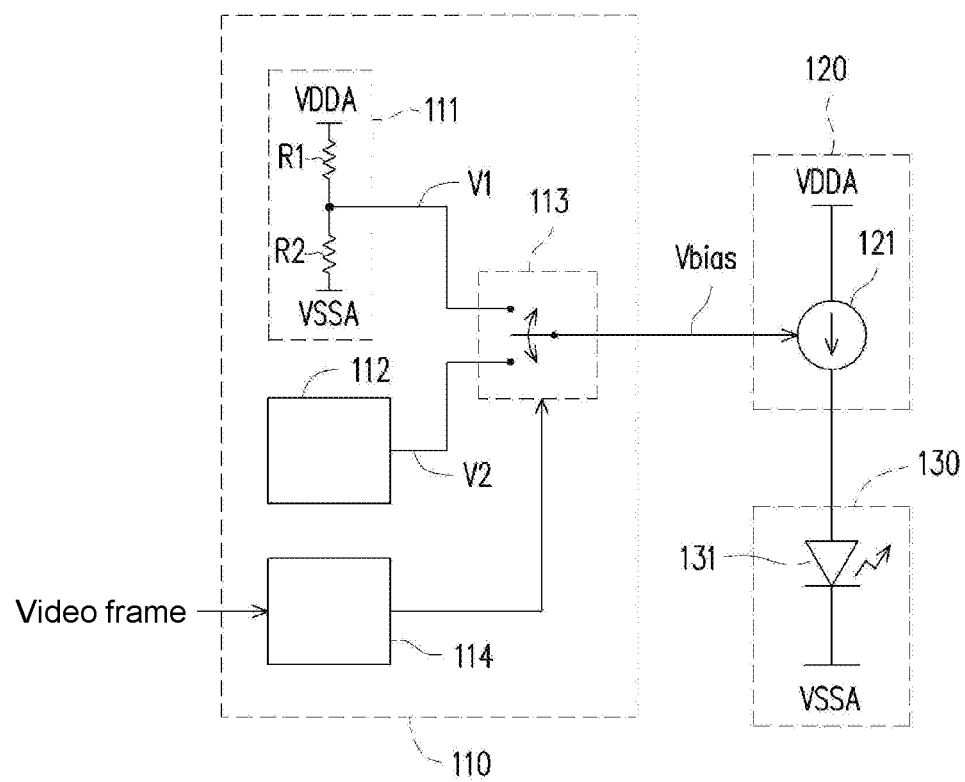
FIG. 8 is a schematic circuit block view of the control circuit, the driving circuit, and the light-emitting device depicted in FIG. 1 according to an embodiment of the invention.

FIG. 8 is a schematic circuit block view of the control circuit 110, the driving circuit 120, and the light-emitting device 130 depicted in FIG. 1 according to an embodiment of the invention. The driving circuit 120 shown in FIG. 8 includes a current source 121. The current source 121 correspondingly provides the driving current to the light-emitting device 130 according to a bias voltage Vbias to generate the projected beam. The light-emitting device 130 shown in FIG. 8 includes an LED 131. According to design requirements, the LED 131 may be the white LED, the red LED, the green LED, or the blue LED mentioned in the previous embodiments. A first terminal (e.g., an anode) of the LED 131 is coupled to a current providing terminal of the current source 121, so as to receive the driving current. A second terminal (e.g., a cathode) of the LED 131 is coupled to a reference voltage VSSA (e.g., a ground voltage or any other fixed voltage).

In any case, the way to operate the driving circuit 120 and the light-emitting device 130 should not be limited to those provided in the embodiment depicted in FIG. 8. For instance, in another embodiment, the first terminal (e.g., the cathode) of the LED 131 is coupled to a current obtaining terminal of the current source 121, and the second terminal (e.g., the anode) of the LED 131 is coupled to a power voltage VDDA. The current providing terminal of the current source 121 is coupled to the reference voltage VSSA. The terminals of the current source 121 are not limited to be coupled to the power voltage VDDA and the reference voltage VSSA and can be changed to be coupled to other bias points according to design requirements.

With reference to FIG. 8, the control circuit 110 includes a voltage generating circuit 111, a bias circuit 112, a switch 113, and a controller 114. The voltage generating circuit 111 is configured to generate a fixed voltage V1. The way to implement the voltage generating circuit 111 is not limited in the embodiment. For instance, the voltage generating circuit 111 may include a resistor R1 and a resistor R2. A first terminal of the resistor R1 is coupled to the power voltage VDDA. A second terminal of the resistor R1 is coupled to the first selection terminal of the switch 113, so as to provide the fixed voltage V1. A first terminal of the resistor R2 is coupled to the second terminal of the resistor R1. A second terminal of the resistor R2 is coupled to the reference voltage VSSA.

The bias circuit 112 is configured to generate a dynamic voltage V2 less than the fixed voltage V1. The way to implement the bias circuit 112 is not limited in the embodiment. For instance, in some embodiments, the bias circuit 112 may be a known bias circuit providing a bias voltage to a driving circuit of a light-emitting device in a known projector. The known bias circuit can generate the dynamic voltage V2 and provide the same to the light-emitting device driving circuit, so as to determine/adjust the current of the light-emitting device (i.e., determine/adjust the brightness of the light-emitting device). The implementation details of the known bias circuit are not explained hereinafter.

The first selection terminal of the switch 113 is coupled to the voltage generating circuit 111 to receive the fixed voltage V1. The second selection terminal of the switch 113 is coupled to the bias circuit 112 to receive the dynamic voltage V2. The common terminal of the switch 113 is coupled to the current source 121 to provide the bias voltage Vbias. The controller 114 can analyze the color content of the video frame, so as to select one of the highlight mode and the normal mode as the selected mode. In the highlight mode, the controller 114 controls the switch 113 to transmit the fixed voltage V1 to the current source 121 as the bias voltage Vbias, and the current source 121 correspondingly supplies a driving current to the light-emitting device 130 according to the bias voltage Vbias (i.e., the fixed voltage V1) to generate the projected light. In the normal mode, the controller 114 controls the switch 113 to transmit the dynamic voltage V2 to the current source 121 as the bias voltage Vbias, and the current source 121 correspondingly supplies a driving current to the light-emitting device 130 according to the bias voltage Vbias (i.e., the fixed voltage V2) to generate the projected light. Since the fixed voltage V1 is greater than the dynamic voltage V2, the brightness of the projected beam of the LED 131 in the highlight mode is greater than the brightness of the projected beam of the LED 131 in the normal mode.

Figure 9:
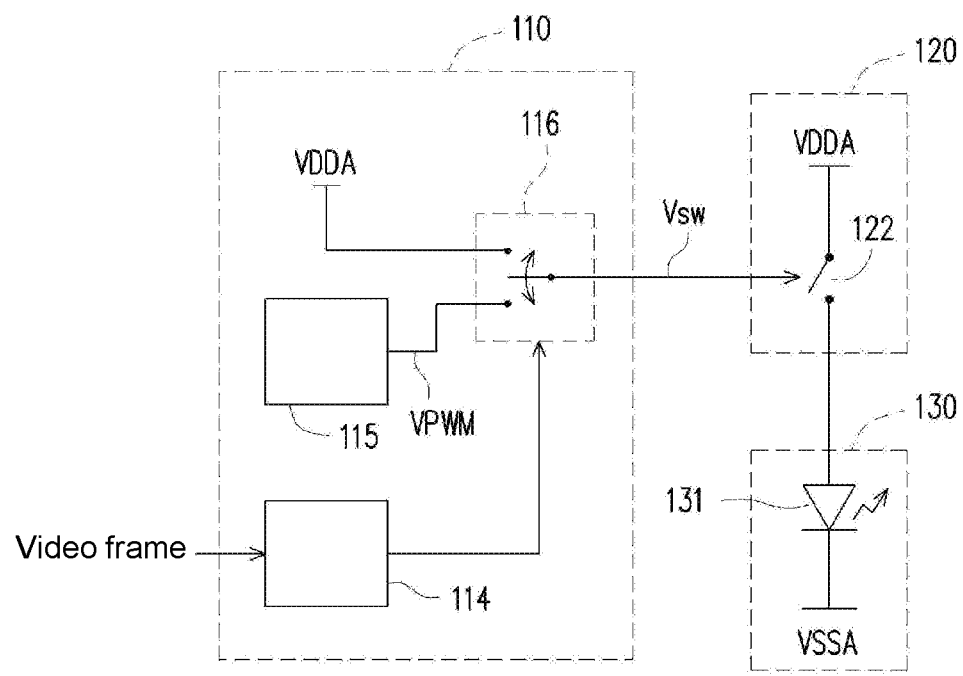
FIG. 9 is a schematic circuit block view of the control circuit, the driving circuit, and the light-emitting device depicted in FIG. 1 according to another embodiment of the invention.

FIG. 9 is a schematic circuit block view of the control circuit 110, the driving circuit 120, and the light-emitting device 130 depicted in FIG. 1 according to another embodiment of the invention. The driving circuit 120 shown in FIG. 9 includes a power switch 122. A first terminal of the power switch 122 is coupled to the power voltage VDDA. A second terminal of the power switch 122 is coupled to the light-emitting device 130. The power switch 122 determines whether to transmit the power voltage VDDA to the light-emitting device 130 according to a switch signal Vsw, so as to generate the projected beam.

The related descriptions of the light-emitting device 130 depicted in FIG. 9 can be found in the descriptions of the light-emitting device 130 depicted in FIG. 8 and thus will be further provided. The first terminal (e.g., the anode) of the LED 131 of the light-emitting device 130 depicted in FIG. 9 is coupled to the second terminal of the power switch 122, so as to receive the power voltage VDDA. The second terminal (e.g., the cathode) of the LED 131 is coupled to the reference voltage VSSA (e.g., the ground voltage or any other fixed voltage). In any case, the way to operate the driving circuit 120 and the light-emitting device 130 should not be limited to those provided in the embodiment depicted in FIG. 9. For instance, in another embodiment, the second terminal (e.g., the anode) of the LED 131 is coupled to the power voltage VDDA, and the first terminal of the power switch 122 is coupled to the reference voltage VSSA.

With reference to FIG. 9, the control circuit 110 includes the controller 114, a pulse width modulation (PWM) circuit 115, and a switch 116. The pulse width modulation circuit 115 is configured to generate a pulse width modulation signal VPWM. A duty ratio of the pulse width modulation signal VPWM is less than 100%. The way to implement the pulse width modulation circuit 115 is not limited in the embodiment. For instance, in some embodiments, the pulse width modulation circuit 115 may be a known pulse width modulation circuit providing a pulse width modulation signal to a driving circuit of a light-emitting device in a known projector. The known pulse width modulation circuit can generate the pulse width modulation signal VPWM and provide the same to the light-emitting device driving circuit, so as to determine/adjust the average current of the light-emitting device (i.e., determine/adjust the brightness of the light-emitting device). The implementation details of the known pulse width modulation circuit are not explained hereinafter.

The first selection terminal of the switch 116 depicted in FIG. 9 is coupled to the fixed voltage. On the condition of "turning on the power switch 122 at a high voltage", the fixed voltage can be the power voltage VDDA or any other fixed voltage sufficient for turning on the power switch 122. On the condition of "turning on the power switch 122 at a low voltage", the fixed voltage can be the reference voltage VSSA or any other fixed voltage sufficient for turning on the power switch 122. The second selection terminal of the switch 116 is coupled to the pulse width modulation circuit 115 to receive the pulse width modulation signal VPWM. The common terminal of the switch 116 is coupled to the control terminal of the power switch 122 to provide the switch signal Vsw.

The controller 114 can analyze the color content of the video frame, so as to select one of the highlight mode and the normal mode as the selected mode. In the highlight mode, the controller 114 controls the switch 116 to transmit the fixed voltage (e.g., the power voltage VDDA) to the control terminal of the power switch 122 as the switch signal Vsw. In the normal mode, the controller 114 controls the switch 116 to transmit the pulse width modulation signal VPWM to the control terminal of the power switch 122 as the switch signal Vsw. The fixed voltage (e.g., the power voltage VDDA) can be considered as a pulse width modulation signal whose duty ratio is 100%, and the duty ratio of the pulse width modulation signal VPWM is less than 100%; hence, in the highlight mode, the brightness of the projected beam of the LED 131 is greater than the brightness of the projected beam of the LED 131 in the normal mode.

Figure 10:
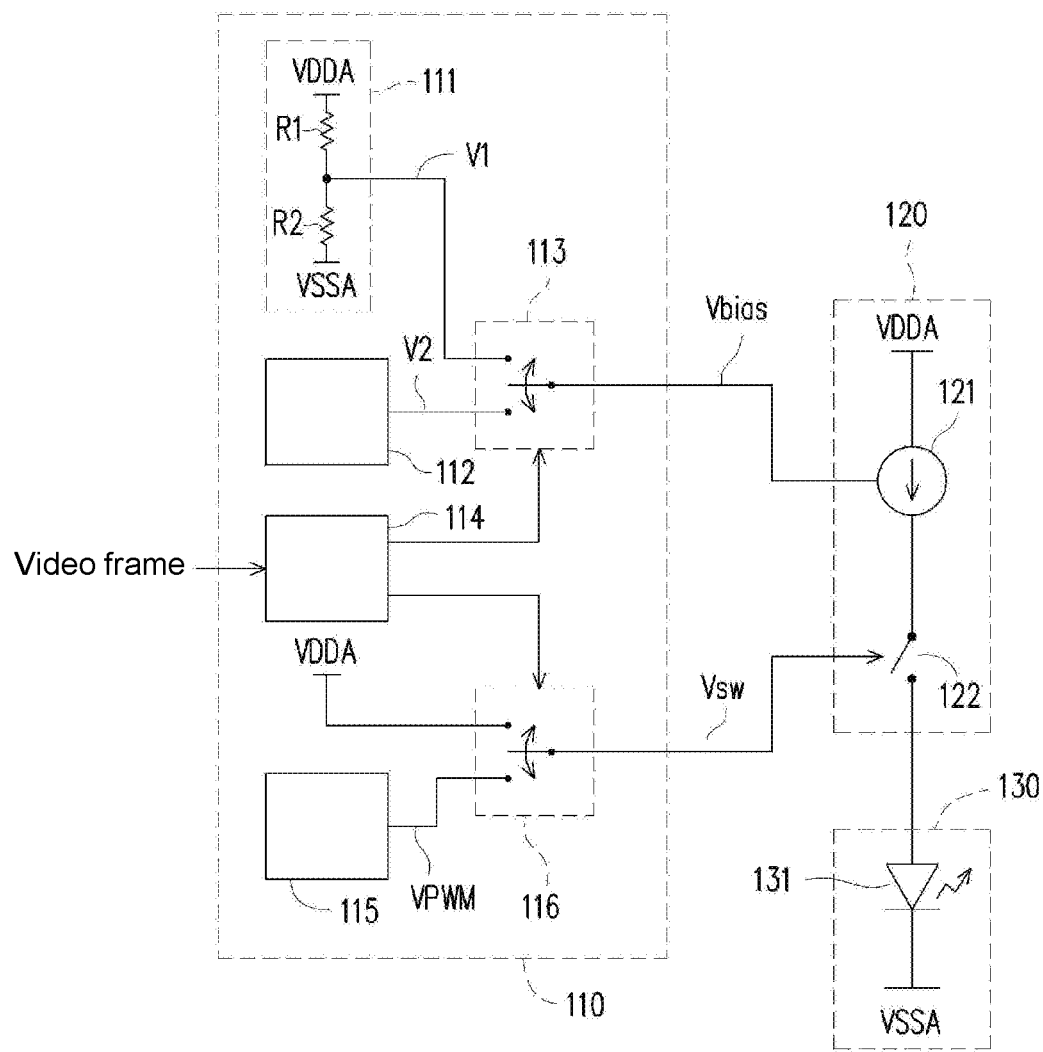
FIG. 10 is a schematic circuit block view of the control circuit, the driving circuit, and the light-emitting device depicted in FIG. 1 according to still another embodiment of the invention.

FIG. 10 is a schematic circuit block view of the control circuit 110, the driving circuit 120, and the light-emitting device 130 depicted in FIG. 1 according to still another embodiment of the invention. The driving circuit 120 shown in FIG. 10 includes the current source 121 and the power switch 122. The current source 121 correspondingly provides the driving current according to the bias voltage Vbias. The first terminal of the power switch 122 is coupled to the current providing terminal of the current source 121, so as to receive the driving current. The second terminal of the power switch 122 is coupled to the light-emitting device 130. The power switch 122 determines whether to transmit the driving current of the current source 121 to the light-emitting device 130 according to the switch signal Vsw, so as to generate the projected beam.

The related descriptions of the light-emitting device 130 depicted in FIG. 10 can be found in the descriptions of the light-emitting device 130 depicted in FIG. 8 or the descriptions of the light-emitting device 130 depicted in FIG. 9 and thus will be further provided. The first terminal (e.g., the anode) of the LED 131 of the light-emitting device 130 depicted in FIG. 10 is coupled to the second terminal of the power switch 122, so as to receive the power voltage VDDA. The second terminal (e.g., the cathode) of the LED 131 is coupled to the reference voltage VSSA (e.g., the ground voltage or any other fixed voltage). In any case, the way to operate the driving circuit 120 and the light-emitting device 130 should not be limited to those provided in the embodiment depicted in FIG. 10. For instance, in another embodiment, the second terminal (e.g., the anode) of the LED 131 is coupled to the power voltage VDDA, the current obtaining terminal of the current source 121 is coupled to the first terminal of the power switch 122, and the current providing terminal of the current source 121 is coupled to the reference voltage VSSA.

With reference to FIG. 10, the control circuit 110 includes the voltage generating circuit 111, the bias circuit 112, the switch 113, the controller 114, the pulse width modulation circuit 115, and the switch 116. The related descriptions of the voltage generating circuit 111, the bias circuit 112, the switch 113, and the controller 114 depicted in FIG. 10 can be found in the descriptions of the voltage generating circuit 111, the bias circuit 112, the switch 113, and the controller 114 depicted in FIG. 8, and the related descriptions of the controller 114, the pulse width modulation circuit 115, and the switch 116 depicted in FIG. 10 can be found in the descriptions of the controller 114, the pulse width modulation circuit 115, and the switch 116 depicted in FIG. 9 and thus will not be further provided.

The controller 114 is configured to analyze the color content of the video frame, so as to select one of the highlight mode and the normal mode as the selected mode. In the highlight mode, the controller 114 controls the switch 113 to transmit the fixed voltage V1 to the current source 121 as the bias voltage Vbias, and the controller 114 controls the switch 116 to transmit the fixed voltage (e.g., the power voltage VDDA) to the control terminal of the power switch 122 as the switch signal Vsw. In the normal mode, the controller 114 controls the switch 113 to transmit the dynamic voltage V2 to the current source 121 as the bias voltage Vbias, and the controller 114 controls the switch 116 to transmit the pulse width modulation signal VPWM to the control terminal of the power switch 122 as the switch signal Vsw. Since the fixed voltage V1 is greater than the dynamic voltage V2, and the duty ratio of the power voltage VDDD is greater than the duty ratio of the pulse width modulation signal VPWM. The brightness of the projected beam of the LED 131 in the highlight mode is greater than the brightness of the projected beam of the LED 131 in the normal mode.

Figure 11:
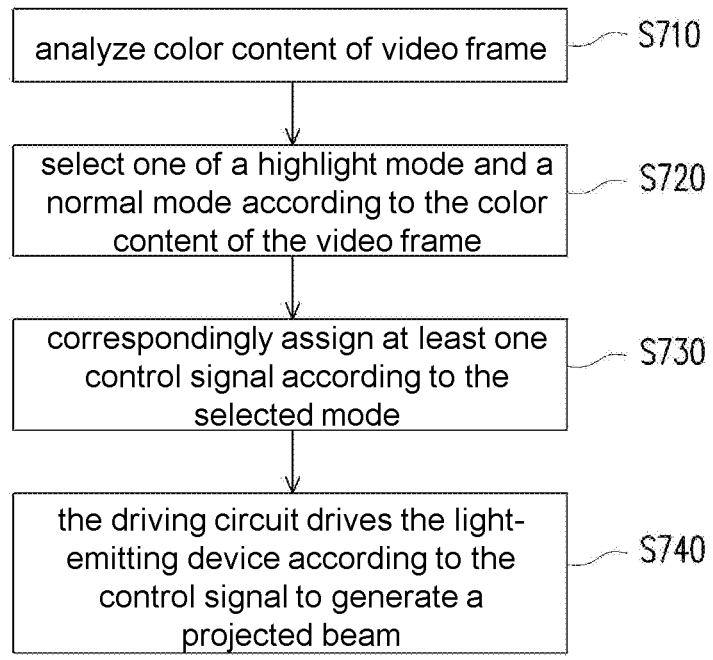
FIG. 11 is a schematic flowchart of an operation method of a projection apparatus according to another embodiment of the invention.

FIG. 11 is a schematic flowchart of an operation method of a projection apparatus according to another embodiment of the invention. In step S710, the control circuit 110 analyzes color content of at least one video frame. In step S720, according to the color content of the video frame, the control circuit 110 selects one of a highlight mode and a normal mode as a selected mode. In step S730, the control circuit 110 correspondingly sets at least one control signal Sc to the driving circuit 120 according to the selected mode. In step S740, according to the control signal Sc, the driving circuit 120 drives the light-emitting device 130 to generate a projected beam. Here, a brightness of the projected beam of the light-emitting device 130 in the highlight mode is greater than the brightness of the projected beam of the light-emitting device 130 in the normal mode.

In some embodiments, the step S720 includes the following: when the color content of the video frame indicates that the video frame is the white image frame, the control circuit 110 selects the highlight mode as the selected mode; when the color content of the video frame indicates that the video frame is not the white image frame, the control circuit 110 selects the normal mode as the selected mode.

In some embodiments, the step S720 includes the following: when the color content of the video frame indicates that the video frame is the white image frame, an operation mode of the control circuit 110 is switched from the normal mode to the highlight mode; when a non-white object shows up in the white image frame, or when the color content of the video frame indicates that the video frame is no longer the white image frame, the operation mode of the control circuit 110 is switched from the highlight mode to the normal mode.

According to some embodiments, in the video frame, if a red sub-pixel satisfies a condition that a gray scale of the red sub-pixel is greater than a red threshold, a ratio of the number of the red sub-pixels satisfying the condition to the number of all red sub-pixels in the video frame is a first ratio; if a green sub-pixel satisfies a condition that a gray scale of the green sub-pixel is greater than a green threshold, a ratio of the number of the green sub-pixels satisfying the condition to the number of all green sub-pixels in the video frame is a second ratio; if a blue sub-pixel satisfies a condition that a gray scale of the blue sub-pixel is greater than a blue threshold, a ratio of the number of the blue sub-pixels satisfying the condition to the number of all blue sub-pixels in the video frame is a third ratio. In some embodiments, the step S720 includes the following: when the first ratio is greater than the first ratio threshold, the second ratio is greater than the second ratio threshold, and the third ratio is greater than the third ratio threshold, the control circuit 110 selects the highlight mode as the selected mode; when the first ratio is less than the first ratio threshold, the second ratio is less than the second ratio threshold, and the third ratio is less than the third ratio threshold, the control circuit 110 selects the normal mode as the selected mode.

In some embodiments, the light-emitting device 130 includes the red LED, the green LED, and the blue LED. In other embodiments, the light-emitting device 130 further includes the white LED.

In some embodiments, in the highlight mode, the light-emitting period of the red LED, the light-emitting period of the green LED, and the light-emitting period of the blue LED are completely overlapped. In the normal mode, the light-emitting period of the blue LED and the light-emitting period of the red LED are not overlapped, and the light-emitting period of the blue LED and the light-emitting period of the green LED are not overlapped. According to other embodiments, in the highlight mode, the light-emitting period of the white LED, the light-emitting period of the red LED, the light-emitting period of the green LED, and the light-emitting period of the blue LED are completely overlapped.

In some embodiments, the control signal Sc includes the first switch signal associated with the red LED, the second switch signal associated with the green LED, and the third switch signal associated with the blue LED. In the highlight mode, the duty ratio of the first switch signal, the duty ratio of the second switch signal, and the duty ratio of the third switch signal are all 100%. In the normal mode, the duty ratio of at least one of the first switch signal, the second switch signal, and the third switch signal is less than 100%.

In some embodiments, the control signal Sc includes the first bias voltage, the second bias voltage, and the third bias voltage. The first bias voltage controls the first current source associated with the red LED, the second bias voltage controls the second current source associated with the green LED, and the third bias voltage controls the third current source associated with the blue LED. In the highlight mode, the first bias voltage is the first fixed voltage, the second bias voltage is the second fixed voltage, and the third bias voltage is the third fixed voltage. In the normal mode, the first bias voltage is a first dynamic voltage less than the first fixed voltage, the second bias voltage is a second dynamic voltage less than the second fixed voltage, and the third bias voltage is a third dynamic voltage less than the third fixed voltage.

In some embodiments, the driving circuit 120 includes the current source 121. The current source 121 correspondingly provides the driving current to the light-emitting device 130 according to the bias voltage Vbais to generate the projected beam. In some embodiments, the step S730 includes the following: generating by the bias circuit 112 the dynamic voltage V2 less than the fixed voltage V1; controlling the switch 113 by the controller 114, wherein the first selection terminal of the switch 113 is coupled to the fixed voltage V1, the second selection terminal of the switch 113 is coupled to the bias circuit 112 to receive the dynamic voltage V2, the common terminal of the switch 113 is coupled to the current source 121 to provide the bias voltage Vbias, and the controller 114 analyzes the color content of the video frame to select one of the highlight mode and the normal mode as the selected mode; in the highlight mode, the fixed voltage V1 is transmitted to the current source 121 as the bias voltage Vbias through the switch 113; in the normal mode, the dynamic voltage V2 is transmitted to the current source 121 as the bias voltage Vbias through the switch 113.

In some embodiments, the driving circuit 120 includes the power switch 122. The first terminal and the second terminal of the power switch 122 are respectively coupled to the power voltage VDDA and the light-emitting device 130. The power switch 122 determines whether to transmit the power voltage VDDA to the light-emitting device 130 according to the switch signal Vsw, so as to generate the projected beam. In some embodiments, the step S730 includes the following: generating the pulse width modulation signal VPWM by the pulse width modulation circuit 115, wherein a duty ratio of the pulse width modulation signal VPWM is less than 100%; controlling the switch 116 by the controller 114, wherein the first selection terminal of the switch 116 is coupled to the fixed voltage (e.g., the power voltage VDDA), the second selection terminal of the switch 116 is coupled to the pulse width modulation circuit 115 to receive the pulse width modulation signal VPWM, and the common terminal of the switch 116 is coupled to the control terminal of the power switch 122 to provide the switch signal Vsw; analyzing by the controller 114 the color content of the video frame to select one of the highlight mode and the normal mode as the selected mode; in the highlight mode, transmitting the fixed voltage (e.g., the power voltage VDDA) to the control terminal of the power switch 122 as the switch signal Vsw through the switch 116; in the normal mode, transmitting the pulse width modulation signal VPWM to the control terminal of the power switch 122 as the switch signal Vsw through the switch 116.

In some embodiments, the driving circuit 120 includes the current source 121 and the power switch 122. The current source 121 correspondingly provides the driving current according to the bias voltage Vbias. The first terminal of the power switch 122 is coupled to the current source 121 to receive the driving current. The second terminal of the power switch 122 is coupled to the light-emitting device 130. The power switch 122 determines whether to transmit the driving current of the current source 121 to the light-emitting device 130 according to the switch signal Vsw, so as to generate the projected beam. In some embodiments, the step S730 includes the following: generating by the bias circuit 112 the dynamic voltage V2 less than the fixed voltage V1; controlling the switch 113 by the controller 114, wherein the first selection terminal of the switch 113 is coupled to the fixed voltage V1, the second selection terminal of the switch 113 is coupled to the bias circuit 112 to receive the dynamic voltage V2, the common terminal of the switch 113 is coupled to the current source 121 to provide the bias voltage Vbias, and the controller 114 analyzes the color content of the video frame to select one of the highlight mode and the normal mode as the selected mode; generating by the pulse width modulation circuit 115 the pulse width modulation signal VPWM, wherein the duty ratio of the pulse width modulation signal VPWM is less than 100%; controlling the switch 116 by the controller, wherein the first selection terminal of the switch 116 is coupled to the fixed voltage (e.g., the power voltage VDDA), the second selection terminal of the switch 116 is coupled to the pulse width modulation circuit 115 to receive the pulse width modulation signal VPWM, and the common terminal of the switch 116 is coupled to the control terminal of the power switch 122 to provide the switch signal Vsw; in the highlight mode, transmitting the fixed voltage V1 to the current source 121 as the bias voltage Vbias through the switch 113 and transmitting the fixed voltage (e.g., the power voltage VDDA) to the control terminal of the power switch 122 as the switch signal Vsw through the switch 116; in the normal mode, transmitting the dynamic voltage V2 to the current source 121 as the bias voltage Vbias through the switch 113 and transmitting the pulse width modulation signal VPWM to the control terminal of the power switch 122 as the switch signal Vsw through the switch 116.

In some embodiments, the operation method further includes: receiving a user's command by a user interface circuit; transmitting the user's command to the control circuit; selecting by the control circuit one of the highlight mode and the normal mode as the selected mode according to the user's command.

According to different design requirements, the block of the control circuit 110 and/or the controller 114 may be implemented in form of one or a combination of hardware, firmware, and software (i.e., programs). As to the form of hardware, the block of the control circuit 110 and/or the controller 114 may be implemented in form of a logic circuit on an integrated circuit. The control circuit 110 and/or controller 114 may be implemented in form of hardware through hardware description languages (e.g., Verilog HDL or VHDL) or other appropriate programming languages. For instance, the related functions of the control circuit 110 and/or the controller 114 may be implemented by one or more controllers, micro-controllers, micro-processors, application-specific integrated circuits (ASIC), digital signal processors (DSP), field programmable gate array (FPGA), and/or logic blocks, modules, and circuits in other processing units.

To sum up, one or more embodiments provided herein have at least one of the following advantages or achieve at least one of the following effects. In the projection apparatus 100 and according to the operation method thereof provided in one or more embodiments of the invention, the color content of the video frame can be analyzed. According to the color content of the video frame, the projection apparatus 100 can switch the operation mode to one of the highlight mode and the normal mode. Hence, the projection apparatus 100 is able to dynamically increase the brightness of the projected beam of the light-emitting device according to actual scenarios.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the invention is intended to be dedicated to the public regardless of whether the element or component is explicitly recited in the following claims.

What is claimed is:

1. A projection apparatus comprising a light-emitting device, a driving circuit, and a control circuit, wherein
the driving circuit is coupled to the light-emitting device and configured to drive the light-emitting device according to at least one control signal, so as to generate a projected beam, and
the control circuit is configured to receive at least one video frame and analyze color content of the at least one video frame, wherein the control circuit selects one of a highlight mode and a normal mode as a selected mode according to the color content and correspondingly sets the at least one control signal to the driving circuit according to the selected mode,
wherein a brightness of the projected beam of the light-emitting device in the highlight mode is greater than the brightness of the projected beam of the light-emitting device in the normal mode,
wherein a ratio of the number of red sub-pixels satisfying a condition that a gray scale of the red sub-pixel is greater than a red threshold in the at least one video frame to the number of all red sub-pixels in the at least one video frame is a first ratio,
a ratio of the number of green sub-pixels satisfying a condition that a gray scale of the green sub-pixel is greater than a green threshold in the at least one video frame to the number of all green sub-pixels in the at least one video frame is a second ratio,
a ratio of the number of blue sub-pixels satisfying a condition that a gray scale of the blue sub-pixel is greater than a blue threshold in the at least one video frame to the number of all blue sub-pixels in the at least one video frame is a third ratio,
when the first ratio is greater than a first ratio threshold, the second ratio is greater than a second ratio threshold, and the third ratio is greater than a third ratio threshold, the control circuit selects the highlight mode as the selected mode, and
when the first ratio is less than the first ratio threshold, the second ratio is less than the second ratio threshold, or the third ratio is less than the third ratio threshold, the control circuit selects the normal mode as the selected mode.

2. The projection apparatus according to claim 1, wherein an operation mode of the control circuit is switched to the highlight mode when the color content of the at least one video frame indicates that the at least one video frame is a white image frame.

3. The projection apparatus according to claim 1, wherein when a non-white object shows up in the white image frame, or when the color content of the at least one video frame indicates that the at least one video frame is no longer the white image frame, an operation mode of the control circuit is switched to the normal mode.

4. The projection apparatus according to claim 1, wherein the driving circuit comprises a current source, the current source correspondingly provides a driving current to the light-emitting device according to a bias voltage to generate the projected beam, and the control circuit comprises a bias circuit, a switch, and a controller,
wherein the bias circuit is configured to generate a dynamic voltage less than a fixed voltage;
wherein the switch has a first selection terminal, a second selection terminal, and a common terminal, the first selection terminal is coupled to the fixed voltage, the second selection terminal is coupled to the bias circuit to receive the dynamic voltage, and the common terminal is coupled to the current source to provide the bias voltage,
wherein the controller is configured to analyze the color content of the at least one video frame, so as to select one of the highlight mode and the normal mode as the selected mode,
wherein the controller controls the switch to transmit the fixed voltage to the current source as the bias voltage in the highlight mode;
wherein the controller controls the switch to transmit the dynamic voltage to the current source as the bias voltage in the normal mode.

5. The projection apparatus according to claim 1, wherein the driving circuit comprises a power switch, a first terminal and a second terminal of the power switch are respectively coupled to a power voltage and the light-emitting device, the power switch determines whether to transmit the power voltage to the light-emitting device according to a switch signal to generate the projected beam, and the control circuit comprises a pulse width modulation circuit, a switch, and a controller,
wherein the pulse width modulation circuit is configured to generate a pulse width modulation signal, and a duty ratio of the pulse width modulation signal is less than 100%,
wherein the switch has a first selection terminal, a second selection terminal, and a common terminal, the first selection terminal is coupled to a fixed voltage, the second selection terminal is coupled to the pulse width modulation circuit to receive the pulse width modulation signal, and the common terminal is coupled to a control terminal of the power switch to provide the switch signal,
wherein the controller is configured to analyze the color content of the at least one video frame, so as to select one of the highlight mode and the normal mode as the selected mode, the controller controls the switch to transmit the fixed voltage to the control terminal of the power switch as the switch signal in the highlight mode, and the controller controls the switch to transmit the pulse width modulation signal to the control terminal of the power switch as the switch signal in the normal mode.

6. The projection apparatus according to claim 1, wherein the driving circuit comprises a current source and a power switch, the current source correspondingly provides a driving current according to a bias voltage, a first terminal of the power switch is coupled to the current source to receive the driving current, a second terminal of the power switch is coupled to the light-emitting device, the power switch determines whether to transmit the driving current to the light-emitting device according to a switch signal to generate the projected beam, and the control circuit comprises a bias circuit, a first switch, a pulse width modulation circuit, a second switch, and a controller,
wherein the bias circuit is configured to generate a dynamic voltage less than a first fixed voltage,
wherein the first switch has a first selection terminal, a second selection terminal, and a common terminal, the first selection terminal of the first switch is coupled to the first fixed voltage, the second selection terminal of the first switch is coupled to the bias circuit to receive the dynamic voltage, and the common terminal of the first switch is coupled to the current source to provide the bias voltage;

wherein the pulse width modulation circuit is configured to generate a pulse width modulation signal, and a duty ratio of the pulse width modulation signal is less than 100%, wherein the second switch has a first selection terminal, a second selection terminal, and a common terminal, the first selection terminal of the second switch is coupled to a second fixed voltage, the second selection terminal of the second switch is coupled to the pulse width modulation circuit to receive the pulse width modulation signal, and the common terminal of the second switch is coupled to a control terminal of the power switch to provide the switch signal, wherein the controller is configured to analyze the color content of the at least one video frame, so as to select one of the highlight mode and the normal mode as the selected mode, wherein in the highlight mode, the controller controls the first switch to transmit the first fixed voltage to the current source as the bias voltage, and the controller controls the second switch to transmit the second fixed voltage to the control terminal of the power switch as the switch signal, wherein in the normal mode, the controller controls the first switch to transmit the dynamic voltage to the current source as the bias voltage, and the controller controls the second switch to transmit the pulse width modulation signal to the control terminal of the power switch as the switch signal.

7. The projection apparatus according to claim 1, further comprising:
a user interface circuit configured to receive a user's command and transmit the user's command to the control circuit,
wherein the control circuit selects one of the highlight mode and the normal mode as the selected mode according to the user's command.

8. A projection apparatus comprising a light-emitting device, a driving circuit, and a control circuit, wherein
the driving circuit is coupled to the light-emitting device and configured to drive the light-emitting device according to at least one control signal, so as to generate a projected beam, and
the control circuit is configured to receive at least one video frame and analyze color content of the at least one video frame, wherein the control circuit selects one of a highlight mode and a normal mode as a selected mode according to the color content and correspondingly sets the at least one control signal to the driving circuit according to the selected mode,
wherein a brightness of the projected beam of the light-emitting device in the highlight mode is greater than the brightness of the projected beam of the light-emitting device in the normal mode,
wherein the light-emitting device comprises a red light-emitting diode, a green light-emitting diode, and a blue light-emitting diode,
wherein the at least one control signal comprises a first bias voltage, a second bias voltage, and a third bias voltage, wherein the first bias voltage controls a first current source associated with the red light-emitting diode, the second bias voltage controls a second current source associated with the green light-emitting diode, and the third bias voltage controls a third current source associated with the blue light-emitting diode, wherein in the highlight mode, the first bias voltage is a first fixed voltage, the second bias voltage is a second fixed voltage, and the third bias voltage is a third fixed voltage,
wherein in the normal mode, the first bias voltage is a first dynamic voltage less than the first fixed voltage, the second bias voltage is a second dynamic voltage less than the second fixed voltage, and the third bias voltage is a third dynamic voltage less than the third fixed voltage.

9. The projection apparatus according to claim 8, wherein in the highlight mode, a light-emitting period of the red light-emitting diode, a light-emitting period of the green light-emitting diode, and a light-emitting period of the blue light-emitting diode are completely overlapped.

10. The projection apparatus according to claim 8, wherein
the light-emitting device further comprises a white light-emitting diode, and a light-emitting period of the white light-emitting diode, a light-emitting period of the red light-emitting diode, a light-emitting period of the green light-emitting diode, and a light-emitting period of the blue light-emitting diode are completely overlapped in the highlight mode.

11. The projection apparatus according to claim 8, wherein
the at least one control signal comprises a first switch signal associated with the red light-emitting diode, a second switch signal associated with the green light-emitting diode, and a third switch signal associated with the blue light-emitting diode, and
a duty ratio of the first switch signal, a duty ratio of the second switch signal, and a duty ratio of the third switch signal are all 100% in the highlight mode.

12. The projection apparatus according to claim 8, wherein an overlapping ratio of two of an activation period of the red light-emitting diode, an activation period of the green light-emitting diode, and an activation period of the blue light-emitting diode is from 0% to 40% in the normal mode.

13. An operation method of a projection apparatus, comprising:
driving a light-emitting device by a driving circuit according to at least one control signal to generate a projected beam;
analyzing color content of at least one video frame by a control circuit; and
selecting, by the control circuit, one of a highlight mode and a normal mode as a selected mode according to the color content, and correspondingly setting the at least one control signal to the driving circuit according to the selected mode,
wherein a brightness of the projected beam of the light-emitting device in the highlight mode is greater than the brightness of the projected beam of the light-emitting device in the normal mode,
wherein the step of selecting one of the highlight mode and the normal mode as the selected mode comprises:
a ratio of the number of red sub-pixels satisfying a condition that a gray scale of the red sub-pixel is greater than a red threshold in the at least one video frame to the number of all red sub-pixels in the at least one video frame is a first ratio,
a ratio of the number of green sub-pixels satisfying a condition that a gray scale of the green sub-pixel is greater than a green threshold in the at least one video frame to the number of all green sub-pixels in the at least one video frame is a second ratio, a ratio of the number of blue sub-pixels satisfying a condition that a gray scale of the blue sub-pixel is greater than a blue threshold in the at least one video frame to the number of all blue sub-pixels in the at least one video frame is a third ratio, when the first ratio is greater than a first ratio threshold, the second ratio is greater than a second ratio threshold, and the third ratio is greater than a third ratio threshold, selecting the highlight mode as the selected mode by the control circuit, and when the first ratio is less than the first ratio threshold, the second ratio is less than the second ratio threshold, or the third ratio is less than the third ratio threshold, selecting the normal mode as the selected mode by the control circuit.

14. The operation method according to claim 13, wherein the step of selecting one of the highlight mode and the normal mode as the selected mode comprises:

switching an operation mode of the control circuit to the highlight mode when the color content of the at least one video frame indicates that the at least one video frame is a white image frame.

15. The operation method according to claim 13, wherein the step of selecting one of the highlight mode and the normal mode as the selected mode comprises:

when a non-white object shows up in the white image frame, or when the color content of the at least one video frame indicates that the at least one video frame is no longer the white image frame, switching an operation mode of the control circuit to the normal mode.

16. The operation method according to claim 13, wherein the driving circuit comprises a current source, the current source correspondingly provides a driving current to the light-emitting device according to a bias voltage to generate the projected beam, and the step of setting the at least one control signal to the driving circuit comprises:

generating a dynamic voltage less than a fixed voltage by a bias circuit;

controlling a switch by a controller, wherein a first selection terminal of the switch is coupled to the fixed voltage, a second selection terminal of the switch is coupled to the bias circuit to receive the dynamic voltage, a common terminal of the switch is coupled to the current source to provide the bias voltage, and the controller analyzes the color content of the at least one video frame, so as to select one of the highlight mode and the normal mode as the selected mode;

transmitting the fixed voltage to the current source as the bias voltage through the switch in the highlight mode; and transmitting the dynamic voltage to the current source as the bias voltage through the switch in the normal mode.

17. The operation method according to claim 13, wherein the driving circuit comprises a power switch, a first terminal and a second terminal of the power switch are respectively coupled to a power voltage and the light-emitting device, the power switch determines whether to transmit the power voltage to the light-emitting device according to a switch signal to generate the projected beam, and the step of setting the at least one control signal to the driving circuit comprises:

generating a pulse width modulation signal by a pulse width modulation circuit, wherein a duty ratio of the pulse width modulation signal is less than 100%;

controlling a switch by a controller, wherein a first selection terminal of the switch is coupled to a fixed voltage, a second selection terminal of the switch is coupled to the pulse width modulation circuit to receive the pulse width modulation signal, a common terminal of the switch is coupled to a control terminal of the power switch to provide the switch signal, and the controller analyzes the color content of the at least one video frame, so as to select one of the highlight mode and the normal mode as the selected mode;

transmitting the fixed voltage to the control terminal of the power switch as the switch signal through the switch in the highlight mode; and transmitting the pulse width modulation signal to the control terminal of the power switch as the switch signal through the switch in the normal mode.

18. The operation method according to claim 13, wherein the driving circuit comprises a current source and a power switch, the current source correspondingly provides a driving current according to a bias voltage, a first terminal of the power switch is coupled to the current source to receive the driving current, a second terminal of the power switch is coupled to the light-emitting device, the power switch determines whether to transmit the driving current to the light-emitting device according to a switch signal to generate the projected beam, and the step of setting the at least one control signal to the driving circuit comprises:

generating a dynamic voltage less than a first fixed voltage by a bias circuit;

controlling a first switch by a controller, wherein a first selection terminal of the first switch is coupled to the first fixed voltage, a second selection terminal of the first switch is coupled to the bias circuit to receive the dynamic voltage, a common terminal of the first switch is coupled to the current source to provide the bias voltage, and the controller analyzes the color content of the at least one video frame, so as to select one of the highlight mode and the normal mode as the selected mode;

generating a pulse width modulation signal by a pulse width modulation circuit, wherein a duty ratio of the pulse width modulation signal is less than 100%;

controlling a second switch by the controller, wherein a first selection terminal of the second switch is coupled to a second fixed voltage, a second selection terminal of the second switch is coupled to the pulse width modulation circuit to receive the pulse width modulation signal, and a common terminal of the second switch is coupled to a control terminal of the power switch to provide the switch signal;

in the highlight mode, transmitting the first fixed voltage to the current source as the bias voltage through the first switch and transmitting the second fixed voltage to the control terminal of the power switch as the switch signal through the second switch; and in the normal mode, transmitting the dynamic voltage to the current source as the bias voltage through the first switch and transmitting the pulse width modulation signal to the control terminal of the power switch as the switch signal through the second switch.

19. The operation method according to claim 13, further comprising:
- receiving a user's command by a user interface circuit;
- transmitting the user's command to the control circuit; and
- selecting, by the control circuit, one of the highlight mode and the normal mode as the selected mode according to the user's command.

20. A operation method of a projection apparatus, comprising:
- driving a light-emitting device by a driving circuit according to at least one control signal to generate a projected beam;
- analyzing color content of at least one video frame by a control circuit; and
- selecting, by the control circuit, one of a highlight mode and a normal mode as a selected mode according to the color content, and correspondingly setting the at least one control signal to the driving circuit according to the selected mode,
- wherein a brightness of the projected beam of the light-emitting device in the highlight mode is greater than the brightness of the projected beam of the light-emitting device in the normal mode,
- wherein the light-emitting device comprises a red light-emitting diode, a green light-emitting diode, and a blue light-emitting diode,
- wherein the at least one control signal comprises a first bias voltage, a second bias voltage, and a third bias voltage, wherein the first bias voltage controls a first current source associated with the red light-emitting diode, the second bias voltage controls a second current source associated with the green light-emitting diode, and the third bias voltage controls a third current source associated with the blue light-emitting diode,
- wherein in the highlight mode, the first bias voltage is a first fixed voltage, the second bias voltage is a second fixed voltage, and the third bias voltage is a third fixed voltage,
- wherein in the normal mode, the first bias voltage is a first dynamic voltage less than the first fixed voltage, the second bias voltage is a second dynamic voltage less than the second fixed voltage, and the third bias voltage is a third dynamic voltage less than the third fixed voltage.

21. The operation method according to claim 20, wherein in the highlight mode, a light-emitting period of the red light-emitting diode, a light-emitting period of the green light-emitting diode, and a light-emitting period of the blue light-emitting diode are completely overlapped.

22. The operation method according to claim 20, wherein the light-emitting device further comprises a white light-emitting diode, and a light-emitting period of the white light-emitting diode, a light-emitting period of the red light-emitting diode, a light-emitting period of the green light-emitting diode, and a light-emitting period of the blue light-emitting diode are completely overlapped in the highlight mode.

23. The operation method according to claim 20, wherein the at least one control signal comprises a first switch signal associated with the red light-emitting diode, a second switch signal associated with the green light-emitting diode, and a third switch signal associated with the blue light-emitting diode, and a duty ratio of the first switch signal, a duty ratio of the second switch signal, and a duty ratio of the third switch signal are all 100% in the highlight mode.

24. The operation method according to claim 20, wherein an overlapping ratio of two of an activation period of the red light-emitting diode, an activation period of the green light-emitting diode, and an activation period of the blue light-emitting diode is from 0% to 40% in the normal mode.

* * * * *